US009632593B2

(12) United States Patent
Kasahara et al.

(10) Patent No.: US 9,632,593 B2
(45) Date of Patent: Apr. 25, 2017

(54) INFORMATION PROCESSING APPARATUS, INFORMATION PROCESSING METHOD, AND COMPUTER-READABLE RECORDING MEDIUM

(71) Applicant: SONY CORPORATION, Tokyo (JP)

(72) Inventors: Shunichi Kasahara, Kanagawa (JP); Osamu Shigeta, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/440,394

(22) PCT Filed: Oct. 16, 2013

(86) PCT No.: PCT/JP2013/078102
§ 371 (c)(1),
(2) Date: May 4, 2015

(87) PCT Pub. No.: WO2014/073346
PCT Pub. Date: May 15, 2014

(65) Prior Publication Data
US 2015/0277583 A1     Oct. 1, 2015

(30) Foreign Application Priority Data

Nov. 9, 2012    (JP) .................................. 2012-247842

(51) Int. Cl.
*G06F 3/0346* (2013.01)
*G06F 3/0488* (2013.01)
(Continued)

(52) U.S. Cl.
CPC ........... *G06F 3/0346* (2013.01); *G02B 27/00* (2013.01); *G06F 3/011* (2013.01); *G06F 3/033* (2013.01);
(Continued)

(58) Field of Classification Search
CPC .......... G06F 3/04883; G06F 3/00–3/01; G06F 3/011; G06F 3/0304–3/0325;
(Continued)

(56) References Cited

U.S. PATENT DOCUMENTS

2013/0106748 A1*  5/2013  Hosaka ................. G06F 9/4443
                                                      345/173

FOREIGN PATENT DOCUMENTS

JP    HEI 11-045149 A    2/1999
JP    2001-154781 A      6/2001
JP    2010-238098 A      10/2010

OTHER PUBLICATIONS

Jun Rekimoto, Masanori Saitoh. "Augmented Surfaces: A Spatially Continuous Work Space for Hybrid Computing Environments." CHI 99 (May 15-20, 1999).

* cited by examiner

*Primary Examiner* — Viet Pham
*Assistant Examiner* — Maheen Javed
(74) *Attorney, Agent, or Firm* — Chip Law Group

(57) ABSTRACT

Provided is an information processing apparatus including an analysis unit configured to decide additional information corresponding to input information on the basis of the input information input in an extended work space in which a real object and a virtual object are operable, and a display control unit configured to receive a new operation input to the input information and execute display control of the virtual object displayed in the extended work space using the additional information.

10 Claims, 15 Drawing Sheets

(51) Int. Cl.
*H04L 29/06* (2006.01)
*G02B 27/00* (2006.01)
*G06F 3/033* (2013.01)
*G06K 9/00* (2006.01)
*G06F 3/01* (2006.01)
*G06F 3/042* (2006.01)
*G06F 3/0484* (2013.01)
*G06F 3/03* (2006.01)
*G06F 3/0354* (2013.01)

(52) U.S. Cl.
CPC ........ *G06F 3/0325* (2013.01); *G06F 3/03545* (2013.01); *G06F 3/0425* (2013.01); *G06F 3/0426* (2013.01); *G06F 3/0488* (2013.01); *G06F 3/04845* (2013.01); *G06K 9/00* (2013.01); *H04L 29/06401* (2013.01)

(58) Field of Classification Search
CPC ......... G06F 3/033; G06F 3/046; G02B 27/00; H04L 29/06401
See application file for complete search history.

FIG. 7
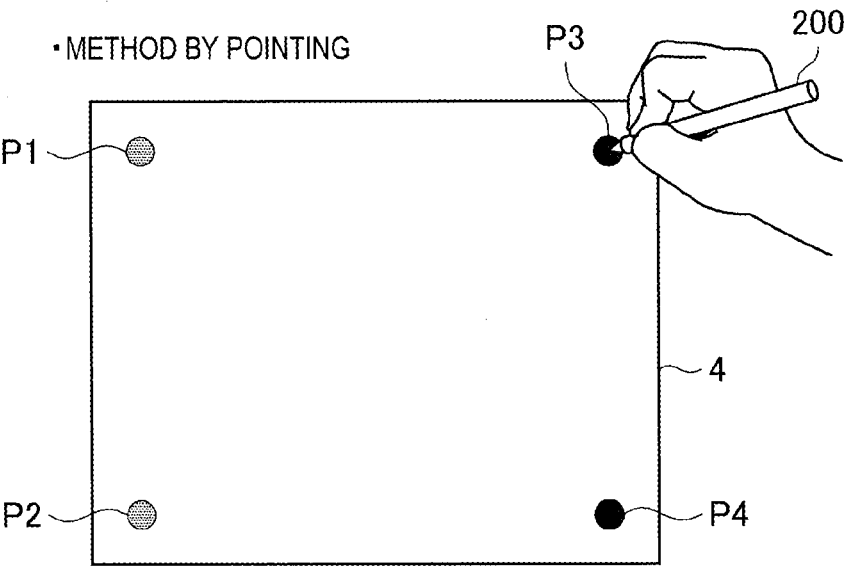
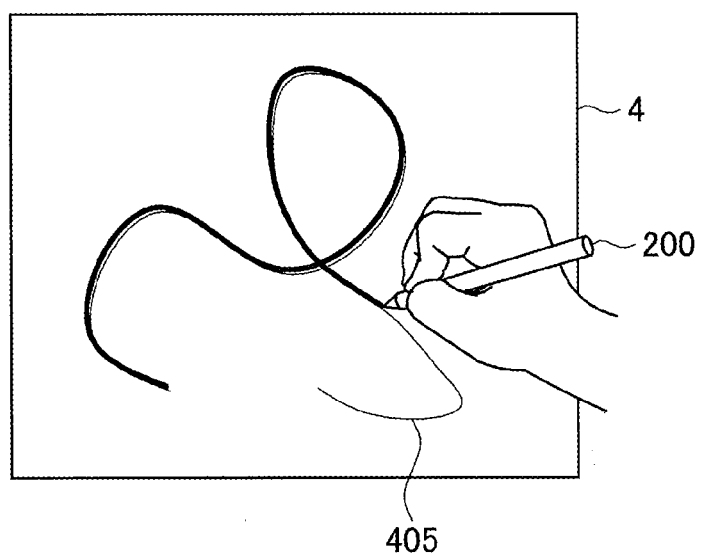

FIG. 9
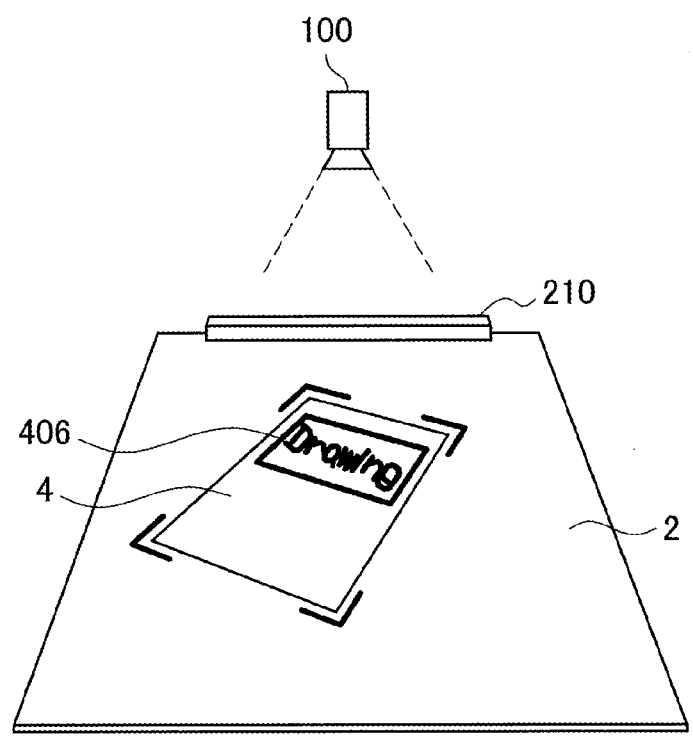
ROTATION
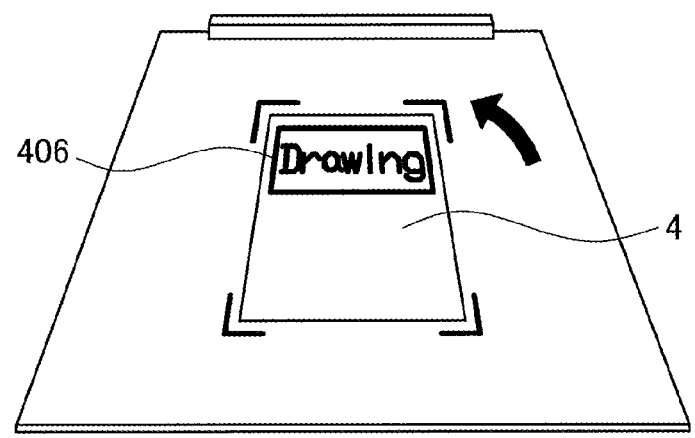

INFORMATION PROCESSING APPARATUS, INFORMATION PROCESSING METHOD, AND COMPUTER-READABLE RECORDING MEDIUM

TECHNICAL FIELD

The present disclosure relates to an information processing apparatus, an information processing method, and a computer-readable recording medium.

BACKGROUND ART

Action with an actually touchable real object, such as writing characters on a paper with a pen, cutting a cooking ingredient in a kitchen, and playing a card game, is unable to be performed in the same space as action using digital information with a personal computer or a smartphone, for example. However, it is anticipated that, in future, digital information is superimposed on a real world using a projector for example, to enable a work in a space which integrates a real world and a digital information world. Some examples are writing a formula on a paper to automatically generate a graph and projecting a cut line on a cooking ingredient to cut it appropriately according to a recipe. AR application for realizing such processes is, for example, the technology disclosed in Patent Literature 1 and others.

A preceding technology that presents digital information on a real world is, for example, a technology using a projector, a head mount display (HMD) of a see-through type, a camera-equipped display such as a smartphone, or the like. In the following, such work space that integrates a real world and digital information is referred to as "extended work space".

CITATION LIST

Patent Literature

Patent Literature 1: JP 2010-238098A

SUMMARY OF INVENTION

Technical Problem

One of input systems that directly acquire input information in the real world as digital information is a handwriting trajectory input system that recognizes a writing trajectory of handwriting to generate its digital information. This input system receives, with a receiver unit, each signal transmitted from an electronic pen that transmits an infrared light signal or an ultrasonic wave signal, and calculates position coordinates of the electronic pen from a reception result of each signal, in order to present a writing trajectory of the electronic pen with digital information. It is contemplated that such an input system is used to further increase variations of works that are performable in the extended work space in which the real world and digital information are integrated.

Thus, the present disclosure proposes a novel and improved information processing apparatus, an information processing method, and a computer-readable recording medium that enable a work to be performed interactively in response to input content of handwriting performed in the extended work space.

Solution to Problem

According to the present disclosure, there is provided an information processing apparatus including an analysis unit configured to decide additional information corresponding to input information on the basis of the input information input in an extended work space in which a real object and a virtual object are operable, and a display control unit configured to receive a new operation input to the input information and execute display control of the virtual object displayed in the extended work space using the additional information.

According to the present disclosure, in the extended work space, additional information corresponding to the input information recognized in the extended work space is reflected, and display of a virtual object is controlled in response to the operation input to the reflected additional information. Such feedback by the display control of information enables an interactive operation, and provides interesting information that a user can intuitively understand.

According to the present disclosure, there is provided an information processing method including deciding additional information corresponding to input information on the basis of the input information input in an extended work space in which a real object and a virtual object are operable, and receiving a new operation input to the input information, and executing display control of the virtual object displayed in the extended work space using the additional information.

According to the present disclosure, there is provided a computer-readable storage medium having a program stored therein, the program causing a computer to function as the above information processing apparatus.

Advantageous Effects of Invention

As described above, the present disclosure provides an information processing apparatus, an information processing method, and a computer-readable recording medium that enable a work to be performed interactively in response to input content of handwriting performed in the extended work space.

BRIEF DESCRIPTION OF DRAWINGS

FIG. 7 is an explanatory diagram illustrating a calibration method in an extended work space system.

FIG. 9 is an explanatory diagram illustrating an example of a tracking display of digital information by an information recognition display device according to the same embodiment.

DESCRIPTION OF EMBODIMENTS

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

Description will be made in the following order.
1. Embodiment of Present Disclosure
  1.1. Exemplary Configuration of Extended Work Space System
  1.2. Function and Configuration of Information Recognition Display Device
  1.3. Information Feedback Process corresponding to Input Information
  1.4. Application to Calibration
  1.5. Tracking Display of Digital Information
  1.6. Remote Function
  1.7. Physical Operation of Digital Information
2. Hardware Configuration Example

1. Embodiment of Present Disclosure

[1.1. Exemplary Configuration of Extended Work Space System]

Figure 1:
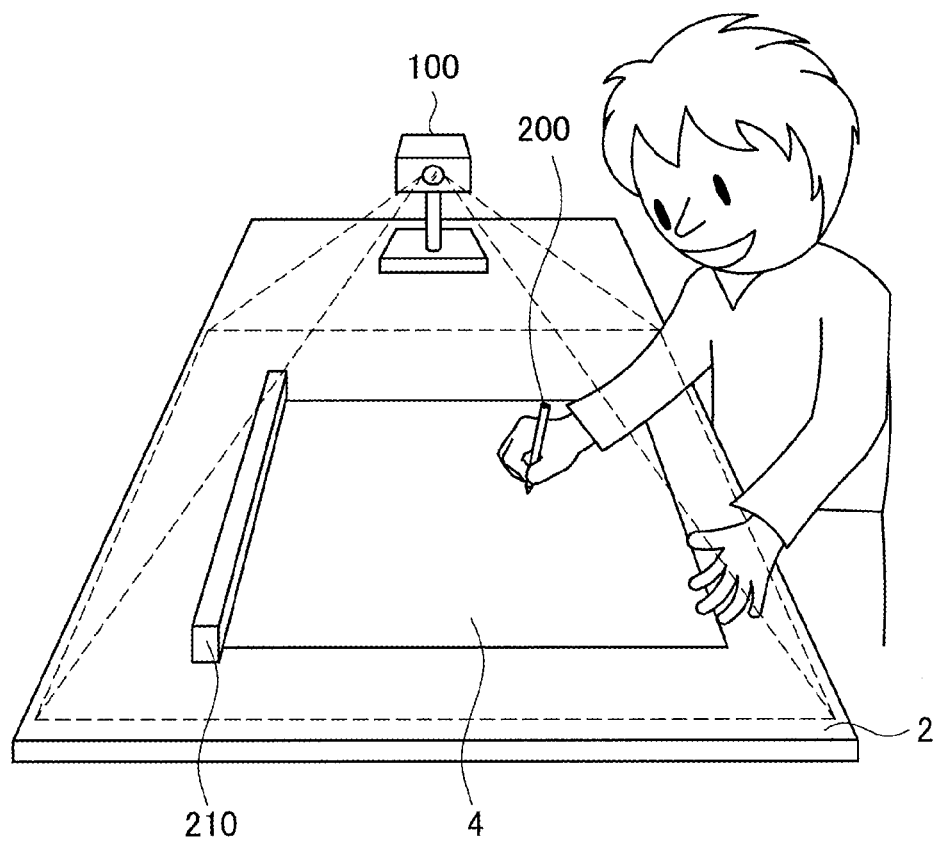
FIG. 1 is an explanatory diagram illustrating an exemplary configuration of an extended work space system according to an embodiment of the present disclosure.

First, with reference to FIG. 1, an exemplary configuration of an extended work space system according to the first embodiment of the present disclosure will be described. FIG. 1 is an explanatory diagram illustrating an exemplary configuration of the extended work space system according to the present embodiment.

The extended work space system according to the present embodiment is a system that recognizes a real object that is present in the real world, and superimposes digital information in the real world, and constructs an extended work space in which the real world and digital information are integrated. The extended work space system includes for example, a projector that projects digital information in the extended work space, a camera that takes an image of the extended work space, a sensing device that recognizes a gesture such as touch, pinch in, and pinch out, performed in the extended work space, and a wireless communication device.

For example, as illustrated in FIG. 1, a tabletop is used as a work surface 2, and an information recognition display device 100 including the projector, the camera, the wireless communication device, and the sensing device is installed on the tabletop to project digital information on the work surface 2, for the purpose of constructing an extended work space. The information recognition display device 100 takes an image of a space including the work surface 2 with the camera, and recognizes a user's gesture performed on the work surface 2 by the sensing device. Also, the projector projects digital information on the work surface 2 to superimpose digital information on an object that is present in the real world.

Although in the extended work space system, the information recognition display device 100 including the projector is installed on the tabletop to project digital information on the work surface 2 in an example of FIG. 1, the projector may be installed on a desk light stand on a tabletop, a ceiling light, a wall, or the like. Also, instead of projecting digital information by the projector, a device of a glasses type such as a camera-equipped head mount display (HMD) and a HMD of a see-through type may be used, for example. In this case, the digital information superimposed in the extended work space is superimposed on the display of the glasses type which is worn by a user. Also, as an alternative of the projector, a device such as a smartphone including a camera and a display may be used to superimpose and display digital information on a through-the-lens image that is captured by the camera and displayed on the display.

Also, the sensing device may be, for example, an IR camera that detects infrared light projected parallelly onto the work surface 2, a stereo camera, a special sensor capable of acquiring depth information, or the like. Also, the sensing device may be a touch sensor that detects a contact of a finger or the like to the work surface 2, and, as shown in FIG. 1, a pen input detecting device 210 capable of acquiring coordinates of a writing trajectory by a digital pen 200 using ultrasonic wave and infrared light, such as upon paper 4. Note that the coordinates of the writing trajectory may be detected by detecting a writing trajectory of a normal pen with another sensor such as a camera, without using the digital pen 200.

The wireless communication device is, for example, a device capable of communicating with an external device such as Bluetooth (registered trademark), Wi-Fi (registered trademark), and NFC (Near Field Communication).

Note that, in the extended work space system according to the present embodiment, the projection region of the projector and the region for tracking the motion of the digital pen 200 are present in a same space, and the relationship therebetween is known. The relationship is acquired by calibration.

[1.2. Function and Configuration of Information Recognition Display Device]

Figure 2:
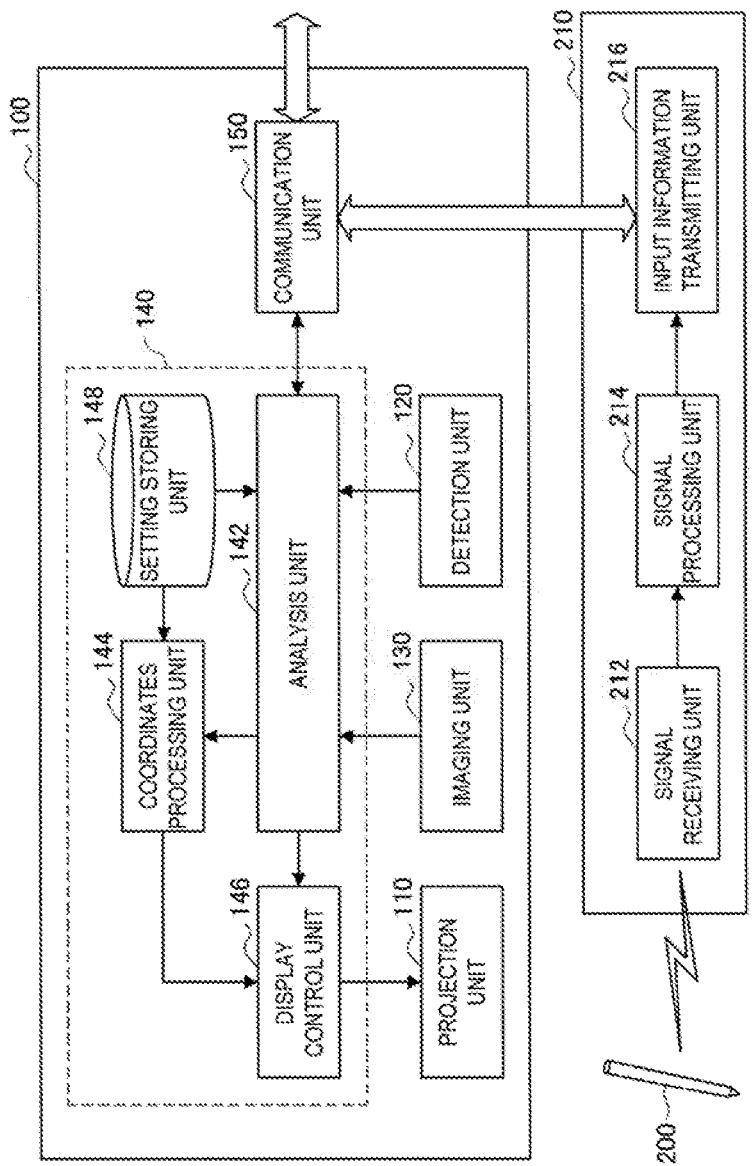
FIG. 2 is a block diagram illustrating a function and configuration of an information recognition display device and a pen input detecting device according to the same embodiment.

Next, on the basis of FIG. 2, function and configuration of the information recognition display device 100 and the pen input detecting device 210 will be described. FIG. 2 is a block diagram illustrating the function and configuration of the information recognition display device 100 and the pen input detecting device 210 according to the present embodiment. First, the information recognition display device 100 according to the present embodiment includes a projection unit 110, a detection unit 120, an imaging unit 130, an information processing unit 140, and a communication unit 150.

The projection unit 110 is a function unit that projects digital information in the extended work space, and is configured by the projector or the like described in FIG. 1. The projection unit 110 receives a display instruction from the information processing unit 140 described later, and displays digital information in the extended work space in which the projection unit 110 is installed.

The detection unit 120 detects motion information in the extended work space. The detection unit 120 is configured by the sensing device or the like described in FIG. 1, for example. The detection unit 120 outputs a detection result to the information processing unit 140 described later.

The imaging unit 130 is a function unit that takes an image of the extended work space, and is configured by the camera or the like described in FIG. 1. The imaging unit 130 outputs a shot image to the information processing unit 140 described later.

The information processing unit 140 analyzes position and motion of an object in the extended work space, and executes a display process of digital information in the extended work space in response to the analysis result. The information processing unit 140 includes a setting storing unit 148, a display control unit 146, a coordinates processing unit 144, and an analysis unit 142, as illustrated in FIG. 2.

The analysis unit 142 analyzes position and motion of an object in the extended work space on the basis of information of at least one of a detection result of the detection unit 120 and a shot image by the imaging unit 130. For example, the analysis unit 142 calculates a change in the motion of a hand of a user from a detection result by the detection unit 120. Then, the analysis unit 142 identifies a gesture, such as touch and pinch in, and pinch out, which a user performs in the extended work space, from the identified change of the motion of a hand of a user with reference to the setting storing unit 148. The analysis result by the analysis unit 142 is operation input information that a user performs in the extended work space, and digital information is displayed in a virtual work space on the basis of the analysis result. The analysis unit 142 outputs an analysis result to the operation deciding unit 146.

Also, the analysis unit 142 receives input information from the pen input detecting device 210 that detects an input of the digital pen 200 described later via the communication unit 150. When a user writes or draws a character string, a pictorial figure, or the like, using the digital pen 200, the written or depicted content is recognized by the pen input detecting device 210, and the recognized content is output to the information recognition display device 100 as input information. The analysis unit 142 analyzes the position relationship between the digital information projected in the extended work space and the real object in the same space, from the input information by the digital pen 200, and associates the input information by the digital pen 200 with them. The analysis unit 142 outputs the analysis result to the coordinates processing unit 144 and the display control unit 146. Note that the input information may be information written on the real object in advance, which is acquired by object recognition.

The coordinates processing unit 144 converts the position in the space to a same coordinates system, with respect to the digital information and the real object in the extended work space and the input information by the digital pen 200. The coordinates processing unit 144 knows the display position of each information in the same coordinates system, in order to easily execute a display process, such as moving display positions of different information in the same direction simultaneously. The coordinates processing unit 144 outputs a coordinates processing result to the display control unit 146.

The display control unit 146 executes a display process of digital information in the extended work space on the basis of the analysis result of the analysis unit 142. For example, when a user takes action to input information with the digital pen 200, the display control unit 146 yields a feedback in response to the action. The feedback content of the display control unit 146 is displayed in the extended work space via the projection unit 110.

The setting storing unit 148 stores the information for unifying an analysis executed in the information processing unit 140 and coordinates systems of various types of information. For example, the analysis unit 142 identifies operation input information that a user performs in the extended work space with reference to the information stored in the setting storing unit 148, and the coordinates processing unit 144 executes a coordinates conversion process of each information in the extended work space.

The communication unit 150 transmits information to, and receives information from, the pen input detecting device 210. Thereby, the handwriting input information by the digital pen 200 is also recognized as one of the information in the extended work space. The communication unit 150 also transmits information to and receives information from the information recognition display device 100 of another extended work space. The communication unit 150 enables information to be exchanged with the information recognition display device 100 of another extended work space, so that each extended work space mutually reflects the situation of another extended work space.

Next, the configuration of the digital pen 200 and the pen input detecting device 210 used in the extended work space according to the present embodiment will be described.

The digital pen 200 is a writing device that a user uses to write characters or the like, and its pen tip, which discharges ink actually, is pushed on a paper or the like to write characters or the like. The digital pen 200 transmits an infrared light signal and an ultrasonic wave signal from the pen tip while writing, which is received by the pen input detecting device 210.

Also, the digital pen 200 according to the present embodiment may switch between an ON state in which the ink is discharged from the pen tip and an OFF state in which the ink is not discharged from the pen tip. Thereby, when characters are written on a paper or the like, the digital pen 200 is used in the ON state. When an operation such as tap and drag is performed, the digital pen 200 is used in the OFF state. This enables the digital pen 200 to input various information. The ON and OFF switching mechanism of the digital pen 200 is, for example, a knock type that provides a switching mechanism at the opposite side from the pen tip, a button type that provides a button around a gripping part, or the like.

The pen input detecting device 210 is a device that receives a signal output from the digital pen 200 to detect the motion of the pen tip of the digital pen 200. The pen input detecting device 210 includes a signal receiving unit 212, a signal processing unit 214, and an input information transmitting unit 216. The signal receiving unit 212 receives the infrared light signal and the ultrasonic wave signal output from the digital pen 200, and outputs them to the signal processing unit 214. The signal processing unit 214 calculates the motion of the pen tip on the basis of reception temporal difference of the infrared light signal and the ultrasonic wave signal at predetermined time intervals. The signal processing unit 214 identifies the position of the pen tip by the above calculation each time. The identified positions are continuously displayed as points to present a smooth line. The position information of the pen tip identified by the signal processing unit 214 is output to the input information transmitting unit 216, and is transmitted from the input information transmitting unit 216 via the communication unit 150 of the information recognition display device 100 to the analysis unit 142.

[1.3. Information Feedback Process Corresponding to Input Information]

The extended work space system according to the present embodiment reflects, in the extended work space, additional information corresponding to the input information recognized in the extended work space, and controls display of a virtual object in response to the operation input to the reflected additional information. Such feedback by the display control of information enables an interactive operation, and provides interesting information that a user can intuitively understand.

Figure 3:
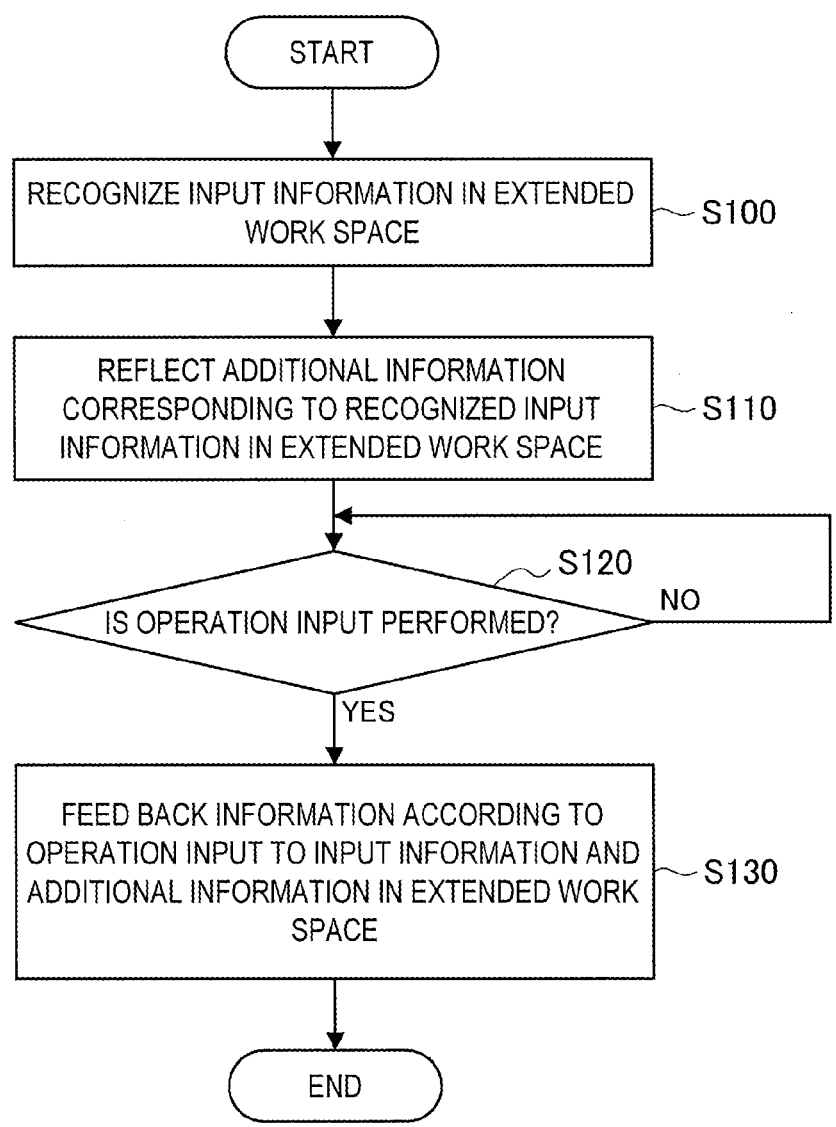
FIG. 3 is a flowchart illustrating an information feedback process according to the same embodiment.
Figure 4:
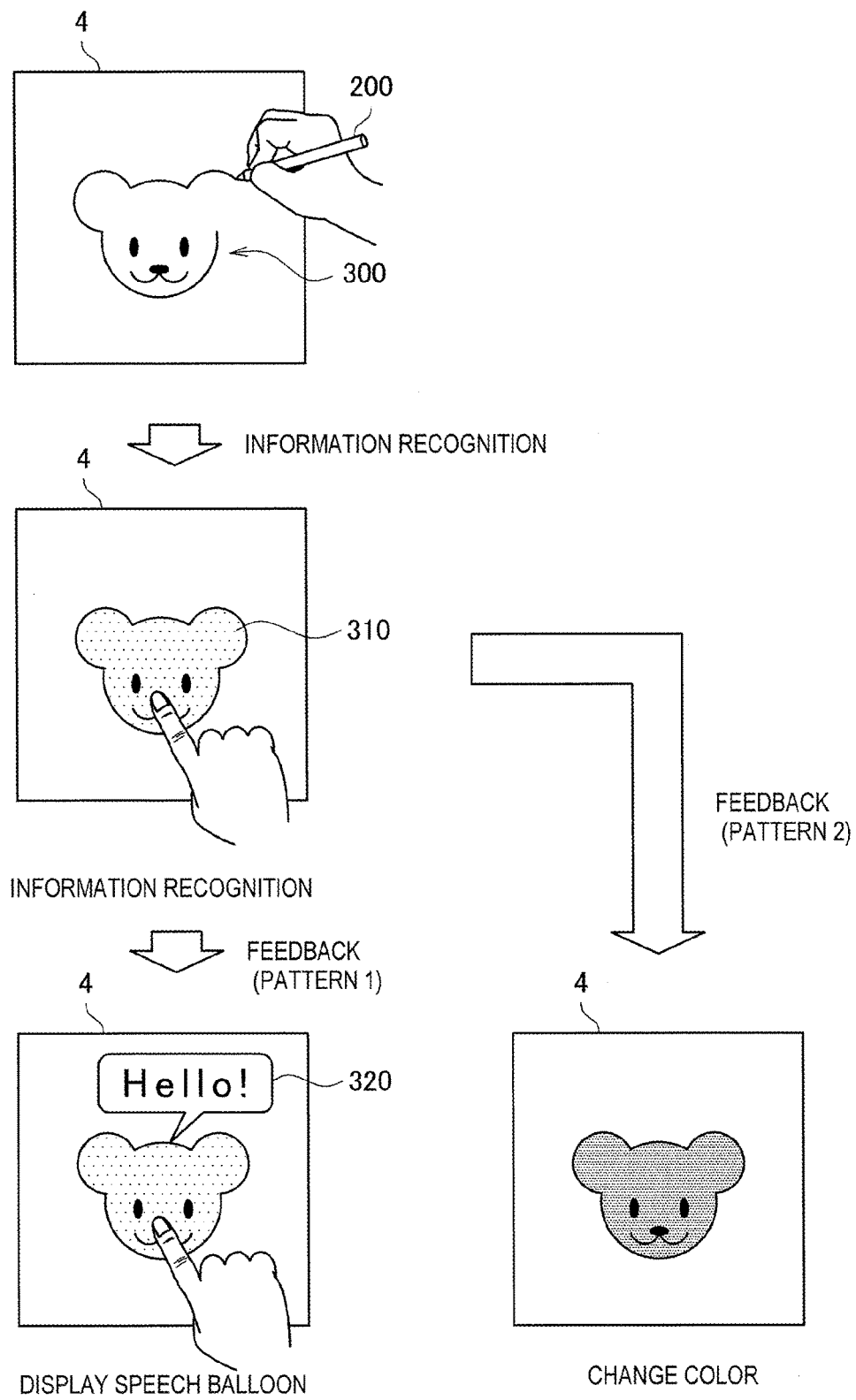
FIG. 4 is an explanatory diagram illustrating an exemplary information display to which an information feedback process according to the same embodiment is applied.

First, on the basis of FIGS. 3 and 4, the information feedback process according to the present embodiment will be described. Note that FIG. 3 is a flowchart illustrating an information feedback process according to the present embodiment. FIG. 4 is an explanatory diagram illustrating an exemplary information display to which the information feedback process according to the present embodiment is applied. Note that, in the following, the additional information is digital information that is set by recognizing the input information, and the virtual object is digital information displayed using the additional information in response to the operation input to the input information.

In the information feedback process according to the present embodiment, first, the input information in the extended work space is recognized by the information recognition display device 100 (S100), as illustrated in FIG. 3. In step S100, a character, a pictorial figure, or the like written or depicted on a paper actually by the digital pen 200 or the like is recognized as input information. For example, as illustrated in the upper side of FIG. 4, a picture 300 is depicted on the paper 4 with the digital pen 200. At this time, each signal transmitted from the digital pen 200 is received by the pen input detecting device 210, and the writing trajectory is output to the information recognition display device 100 as input information.

In the information recognition display device 100 that has received the input information, the analysis unit 142 reflects, in the extended work space, the additional information corresponding to the recognized input information (S110). That is, upon recognizing the input information, the information recognition display device 100 gives the additional information to the extended work space, to yield a feedback for the operation input to the input information. The additional information may be information that a user can visually confirm, or information that is unable to be visually confirmed. In the example of FIG. 4, the analysis unit 142 sets a region surrounded by the profile of the picture 300 depicted on the paper 4 as a recognition region 310, and adds information. The information recognition display device 100 may clearly notify a user that the recognition region 310 is set, by coloring the inside or the profile of the recognition region 310 or other methods. Alternatively, the information recognition display device 100 may be configured to not clearly notify a user of the recognition region 310.

Thereafter, the information recognition display device 100 determines whether or not an operation input is performed to the input information, at regular time intervals (S120). If the information recognition display device 100 determines that the operation input is performed, the information recognition display device 100 feeds back the information according to the operation input, using additional information by display control (S130). The information that is fed back is decided on the basis of the content of input information and additional information to the input information, and is in advance stored in the setting storing unit 148. FIG. 4 illustrates two exemplary feedbacks. For example, when a user touches the inside of the picture 300 depicted on the paper 4, that is, the recognition region 310 with a finger, the feedback may be display of a speech balloon 320 (pattern 1). Alternatively, when a user touches the inside of the picture 300 depicted on the paper 4 with a finger in the same way, the color of the picture 300 may be changed as a feedback (pattern 2).

In the above, the information feedback process according to the present embodiment has been described. New information fed back to the information input by user's handwriting enables an interactive operation, and provides interesting information that a user can intuitively understand. Also, in the present technology, the input information recognized by the information recognition display device 100 may be independent, with respect to its content, from the operation input that is input to the input information after the additional information is added, without direct relationship therebetween. For example, in FIG. 3, the input information of the depicted picture and the operation input of touching the picture for displaying a speech balloon are not continuous with respect to their content. However, this provides new information for the information that is first input, and develops the information in the extended work space more widely.

Figure 5:
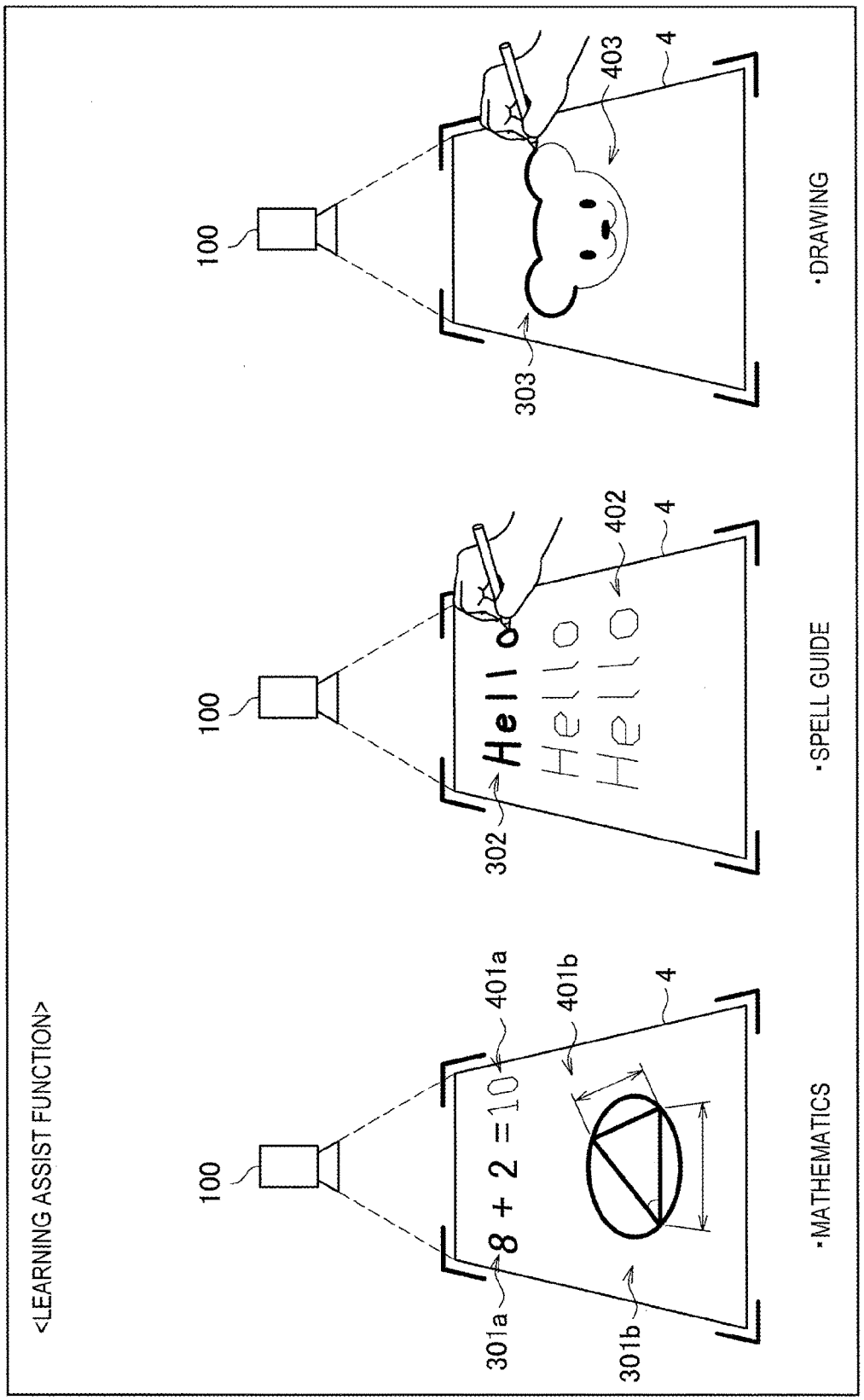
FIG. 5 is an explanatory diagram illustrating a learning assist function to which an information feedback process according to the same embodiment is applied.

Such an information feedback process may be applied to an educational application as illustrated in FIG. 5 for example, in addition to the example illustrated in FIG. 4. In an example of FIG. 5, work of a user is assisted by displaying assistive information as digital information (information 401*a*, 401*b* illustrated by thin lines), for the content (301*a*, 301*b*) actually written on the paper 4 with ink. In an example of mathematics, an answer for a formula written on an answer sheet is displayed, or an assistive line for a pictorial figure is displayed, to provide information for presenting a correct answer or for leading to a correct answer. Also, in an example of spell guide, a user is assisted by displaying digital information 402 of a correct spell on the paper 4 and having the user trace the digital information with a pen (the line indicated by the reference sign 302). Alternatively, in an example of the drawing, a user is assisted by displaying digital information 403 of an underdrawing of a picture and having the user trace the digital information with a pen (the line indicated by the reference sign 303), or by displaying digital information of lines for leading to completion on a picture that has not been completed.

Figure 6:
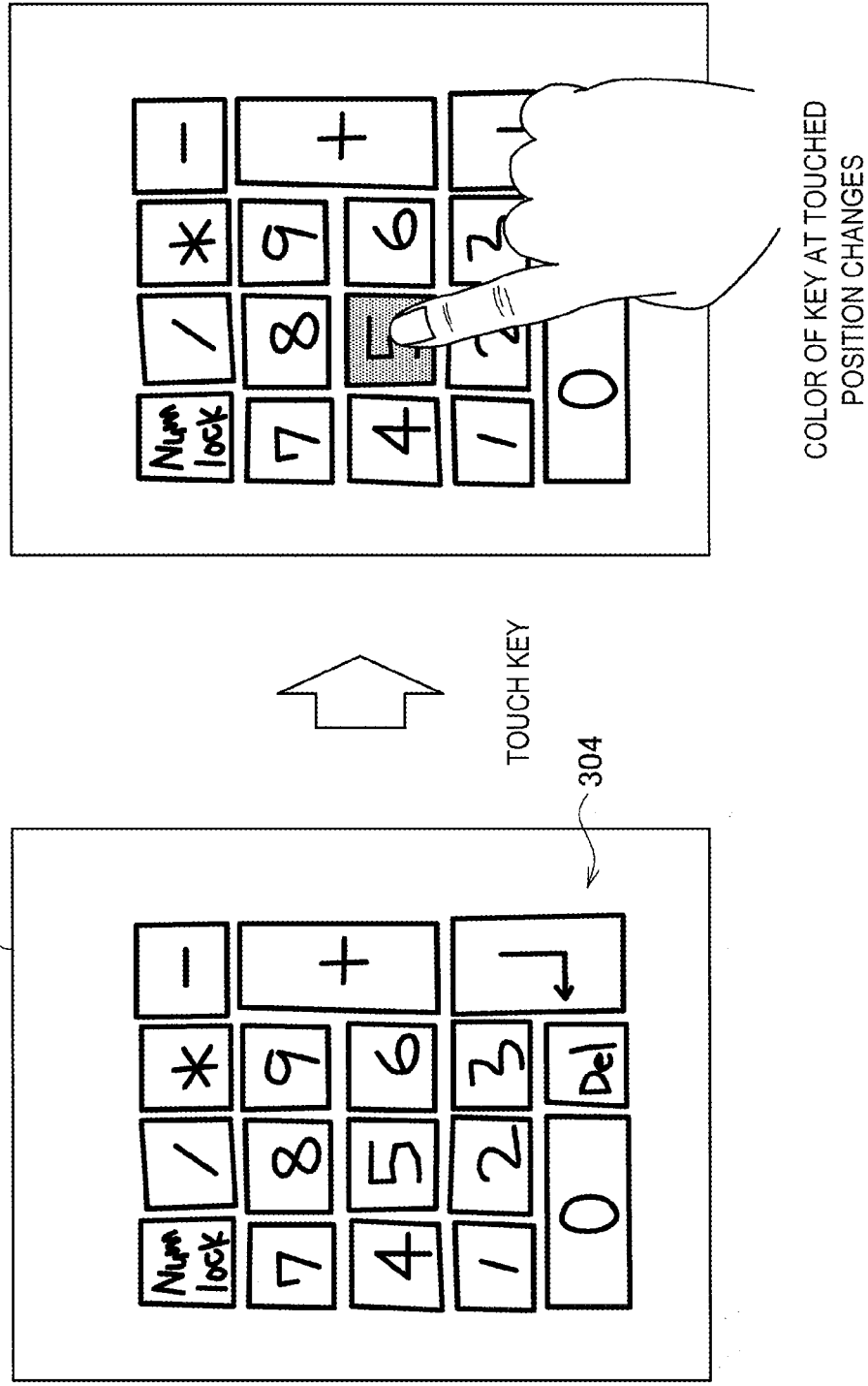
FIG. 6 is an explanatory diagram illustrating an example of an information feedback process in a calculator displayed by digital information.

Also, the information feedback process according to the present embodiment may also be applied to a process for executing a feedback to a region where a user has touched, in the input device of the handwriting illustrated in FIG. 6. FIG. 6 illustrates a calculator 304 depicted on the paper 4 by handwriting. As for this calculator 304, each key is recognized by the information recognition display device 100 in the extended work space, and a recognition region is set for each key as additional information. Thereafter, when a user touches a key on the paper 4, the color of the key corresponding to the touched recognition region changes as a feedback. As described above, the information feedback process according to the present embodiment can also notify a user of the user's operation input in an easily understandable manner.

[1.4. Application to Calibration]

As described above, in the extended work space system according to the present embodiment, the projection region of the projector and the region for tracking the motion of the digital pen 200 are present in the same space, and the relationship therebetween is acquired in advance by calibration. As a method of calibration, there is a method in which four points P1 to P4 set at four corners of the paper 4 put in the extended work space are pointed with the digital pen, for example, as illustrated in the upper side of FIG. 7.

Also, in the extended work space system according to the present embodiment, the information feedback process described above may be developed, so that the calibration is conducted by pictorial figure trace. In such a calibration method, a pictorial figure 405 is projected and displayed on the paper 4 by a projector, when the paper 4 is put in the extended work space for example. Then, the calibration is conducted by tracing the displayed pictorial figure with the digital pen 200, a finger, or the like.

When the projection plane of digital information tilts, the calibration is to be executed each time the information recognition display device 100 is installed. The calibration by the pictorial figure trace can be conducted by a user simply, and can also be used as a gesture input for ending an input unlock state in the extended work space, for example. In this case, a user performs one gesture input to execute two processes of calibrating and ending the input unlock state, in order to reduce a user's input load.

[1.5. Tracking Display of Digital Information]

The extended work space system according to the present embodiment is capable of inputting information using the digital pen 200. As described above, the digital pen 200 according to the present embodiment controls discharge of ink by the ON and OFF switching mechanism. A user can actually writes characters or the like on the paper 4 by discharging ink, and can perform input operation such as touching without discharging ink, and can write characters or the like which is not written with actual ink but displayed as digital information.

When discharge of ink is set in an OFF state, the information recognition display device 100 may display check information that requests a user to use the digital pen 200 in the extended work space. The check information may be information that enables a user to select whether to use by selecting YES or NO to a question such as "Do you input by handwriting?", for example. When YES is selected, the information recognition display device 100 displays information input by handwriting, which is an analysis result of the motion of the digital pen 200, as information digital information, in the extended work space. On the other hand, when NO is selected, the information recognition display device 100 recognizes that the motion of the digital pen 200 is for operation input, and executes a process according to the operation input.

Here, a situation in which the discharge of ink is in an OFF state and the digital pen 200 is used for handwriting input is assumed. At this time, when the digital information displayed for handwriting input by the digital pen 200 is projected on the object in the extended work space, the digital information remains at the current display position even if the object moves, since the object and the digital information are independent of each other. This may create a situation not intended by a user in which a character does not move along with the movement of the object, even when the user intends to write a character on the object as digital information.

Figure 8:
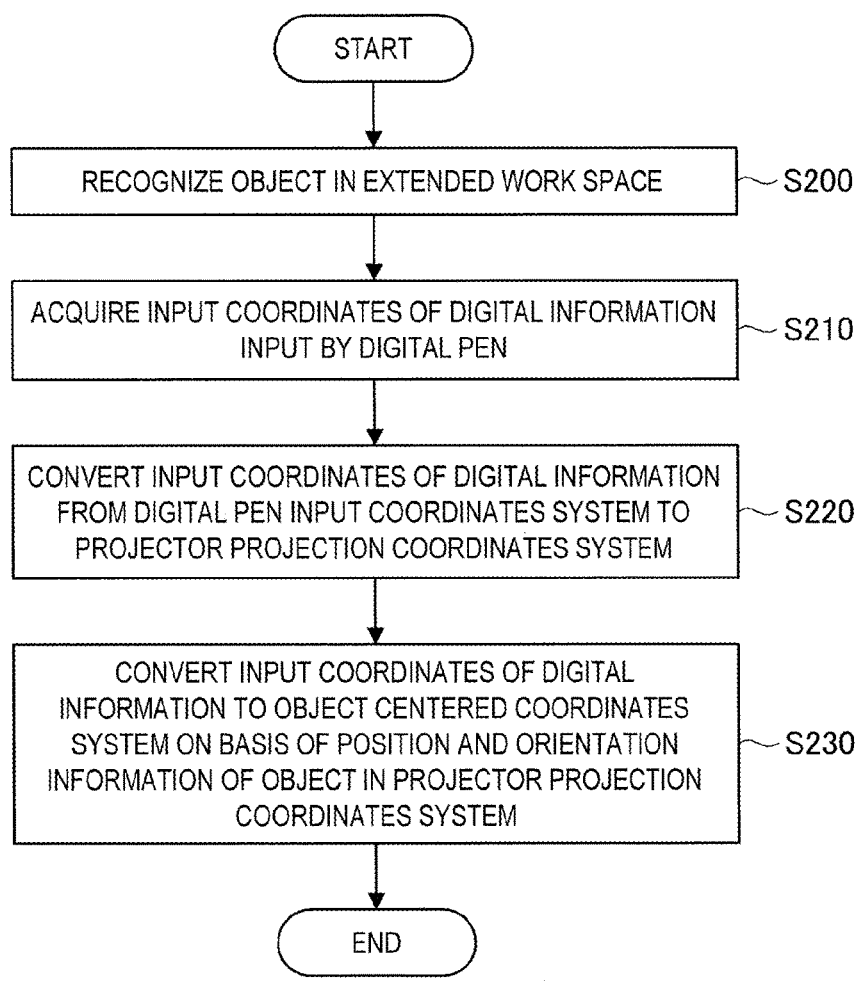
FIG. 8 is a flowchart illustrating a tracking display process of digital information by an information recognition display device according to the same embodiment.

Thus, the information recognition display device 100 according to the present embodiment recognizes the object in the extended work space, and tracks the object for which handwriting input is performed by the digital pen 200. The information recognition display device 100 executes a process that moves digital information input by handwriting on the object along with the movement of the tracked object, in order to have a user recognize digital information as the information written on the object. In the following, on the basis of FIGS. 8 and 9, such a process will be described in detail. Note that FIG. 8 is a flowchart illustrating the tracking display process of digital information by the information recognition display device 100 according to the present embodiment. FIG. 9 is an explanatory diagram illustrating an example of the tracking display of digital information by the information recognition display device 100 according to the present embodiment.

First, as illustrated in FIG. 8, the information recognition display device 100 recognizes an object in the extended work space (S200). In step S200, object recognition that recognizes an object, such as a paper, a text, and a book, for example, in the extended work space may be executed by image recognition, or the like. At this time, the position and orientation of the object in the extended work space is recognized in the projection coordinates system of the projector which is the projection unit 110.

On the other hand, the pen input detecting device 210 transmits input coordinates of digital information input by handwriting with the digital pen 200, which are based on the position information of the pen tip of the digital pen 200, to the information recognition display device 100 (S210). The input coordinates of digital information input by the digital pen 200 is expressed in a digital pen input coordinates system defined by the pen input detecting device 210 that detects the motion of the digital pen 200.

The information recognition display device 100 receives the input coordinates of digital information input by the digital pen 200 from the pen input detecting device 210, and converts the input coordinates from the digital pen input coordinates system to a projector projection coordinates system (S220). In step S220, a process for adjusting both coordinates systems of the input coordinates of digital information and the position and orientation information of the object to each other is executed.

Further, the information recognition display device 100 converts the input coordinates of digital information converted to the projector projection coordinates system, to the coordinates system of the object center, on the basis of the position and orientation information of the object recognized in step S200, (S230). The information recognition display device 100 knows the position relationship between the object and the digital information by the process of step S220. Then, in step S230, the input position of digital information is expressed in the coordinates system that centers the object, to display digital information in the coordinates system of the object even when the object moves in the extended work space, so that the digital information is displayed to move along with the object.

For example, as illustrated in the upper side of FIG. 9, the pen input detecting device 210 that receives the output signal of the digital pen 200 and the paper 4 are put on the work surface 2 of the extended work space built by the information recognition display device 100. The character 406 input by handwriting with the digital pen 200 is displayed on the paper 4 as digital information. That is, the character 406 is not actually written on the paper 4, but is independent of the paper 4. At this time, the information recognition display device 100 acquires the position and orientation information of the paper 4 in the projector coordinates system, and converts the input coordinates of the character 406 from the digital pen input coordinates system to the projector coordinates system, and thereafter further converts it to the coordinates system that centers the paper 4.

In such a state, the information recognition display device 100 tracks the paper 4. Then, when the paper 4 is rotated as illustrated in the lower side of FIG. 9, the information recognition display device 100 detects the rotation of the paper 4 to acquire new position and orientation information of the paper 4 in the projector coordinates system. Then, in response to the change of the position and orientation of the paper 4, the information recognition display device 100 changes the display position of the character 406 on the basis of the center coordinates system of the paper 4 by the amount of change. Thereby, the character 406 displayed on the paper 4 is also moved and displayed integrally with the paper 4, in order to provide a user with display with no feeling of strangeness.

Figure 10:
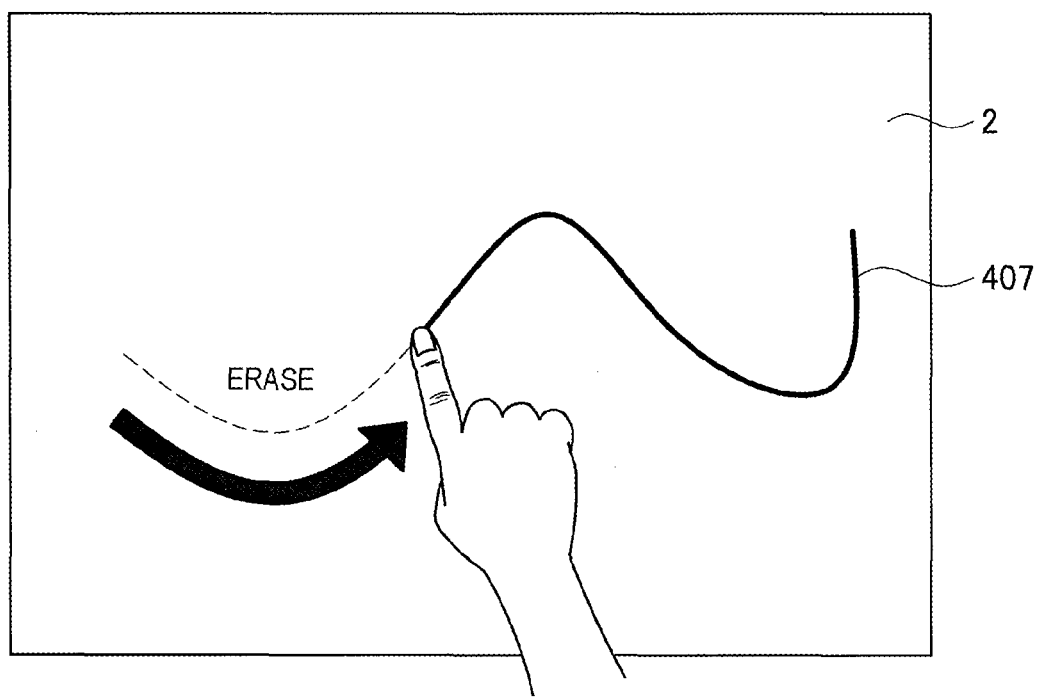
FIG. 10 is an explanatory diagram illustrating an example of an erasing method of digital information.

Note that, for example, the character or the like input by handwriting as digital information by the digital pen 200 may be erased by combining the input by the digital pen 200 and the shape or the like of a hand, arm, or the like of a user recognized by the information recognition display device 100. For example, as illustrated in FIG. 10, the pictorial figure 407 of digital information input by handwriting by the digital pen 200 is displayed by the projection unit 110 on the work surface 2 of the extended work space. Here, when recognizing that a user contacts a finger on the work surface 2 and periodically moves the finger on the pictorial figure 407, the information recognition display device 100 omits drawing a part of the pictorial figure 407 where the finger is moving. Thereby, the digital information input by the digital pen 200 is expressed in an erased manner.

[1.6. Remote Function]

The extended work space system according to the present embodiment may have a remote function for mutually displaying information of a plurality of extended work spaces. This remote function enables collaboration work and work assistance by users who are remote from each other. As one example of the work assistance using the remote function, FIG. 11 illustrates an example in which learning assistance is performed for a student who actually studies using a textbook.

Figure 11:
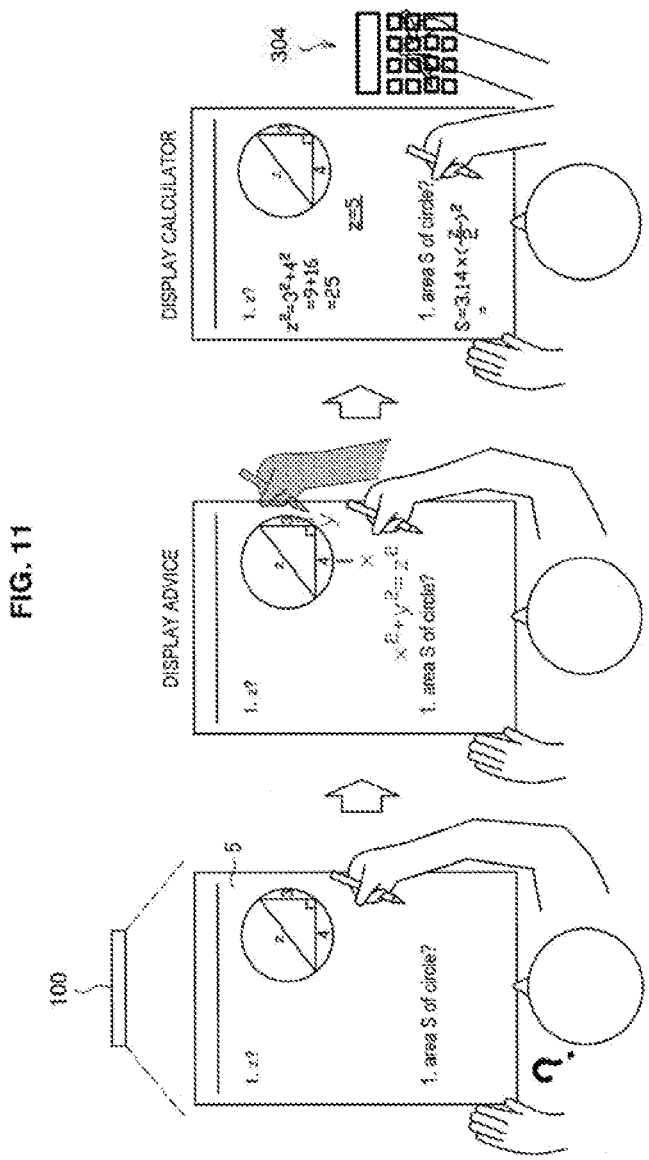
FIG. 11 is an explanatory diagram illustrating an example in which learning assistance is performed for a student who studies using a textbook actually, as one example of work assistance using a remote function.

As illustrated in the left side of FIG. 11, the student studies using the textbook 5 of the mathematics. The textbook 5 is put on the work surface 2 of the extended work space built by the information recognition display device 100. A teacher, who is at a remote place, can watch the learning situation of the student by means of the imaging unit 120 of the information recognition display device 100. At this time, the information recognition display device is installed on the side of the teacher as well to build the extended work space, and the information recognition display device 100 on the side of the student and the information recognition display device on the side of the teacher are connected to each other to communicate with information.

When the teacher watches a situation where the learning of the student does not advance, the teacher writes hint information for solving the problem using the digital pen or the like in the extended work space on the side of the teacher. The input information of the teacher is transmitted from the information recognition display device on the side of the teacher to the information recognition display device 100 on the side of the student, and is taught in the extended work space on the side of the student as illustrated in the center of FIG. 11. At this time, the input information of the teacher is displayed at the position corresponding to the content of the textbook 5, by matching both projector coordinates systems of the extended work space on the side of the teacher and on the side of the student. As described above, the remote function enables the teacher, who is at a remote place, to assist the student in learning.

Also, as the student learning assistive function, the calculator 304 illustrated in FIG. 6 may be displayed and used in the extended work space as necessary, for example as illustrated in the right side of FIG. 11. The student performs a predetermined gesture such as double tap for example, or displays an operation menu or the like to select an item in the calculator display, in order to display the calculator 304 on the work surface of the extended work space. As described above, an appropriate device is displayed and used as digital information to eliminate an actual device and to enhance convenience.

[1.7. Physical Operation of Digital Information]

The digital information displayed in the extended work space may be made operable by operation in accordance with laws of physics using an actual object, such as a paper, present in the extended work space. In this case, the information recognition display device 100 executes a display process of digital information displayed in the extended work space on the basis of the actual object recognized in the extended work space and the operation performed to the object.

(1) Erasing of Digital Information

Figure 12:
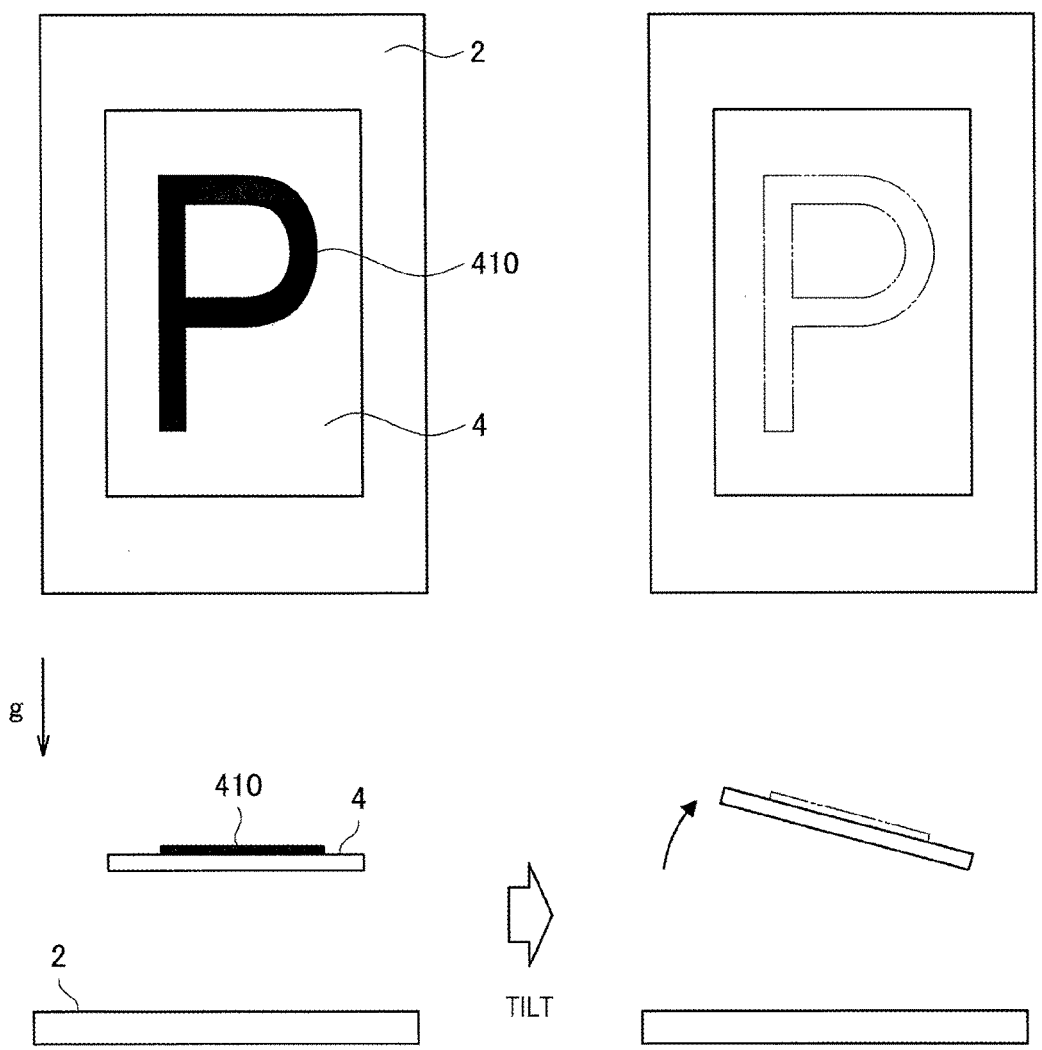
FIG. 12 is an explanatory diagram illustrating an example of an erasing method of digital information by physical operation of an object.

For example, as illustrated in the left side of FIG. 12, digital information 410 is projected on the paper 4 in the extended work space. Note that, in the left and right figures of FIG. 12, the upper side illustrates the work surface 2 of the extended work space in a state viewed from above, and the lower side illustrates the extended work space in a state viewed from side. Although, in FIG. 12, the digital information 410 displayed on the paper 4 is illustrated with thickness for the purpose of explanation, the digital information 410 may have no thickness actually.

In the example of FIG. 12, as an erasing method of the digital information 410 projected on the paper 4, the digital information 410 may be erased when the paper 4 is tilted from a state in which the paper surface is perpendicular to the gravitational force direction. If the digital information 410 were an object, the digital information 410 on the paper 4 would fall along the slope by the gravitational force when the paper 4 is tilted. Thus, as for the digital information 410 which is virtual information, the digital information falls and disappears from the paper 4 by tilt of the paper 4 as illustrated in the right side of FIG. 12, to enable a user to erase digital information by intuitively understandable operation.

(2) Digital Information Display on Object

Figure 13:
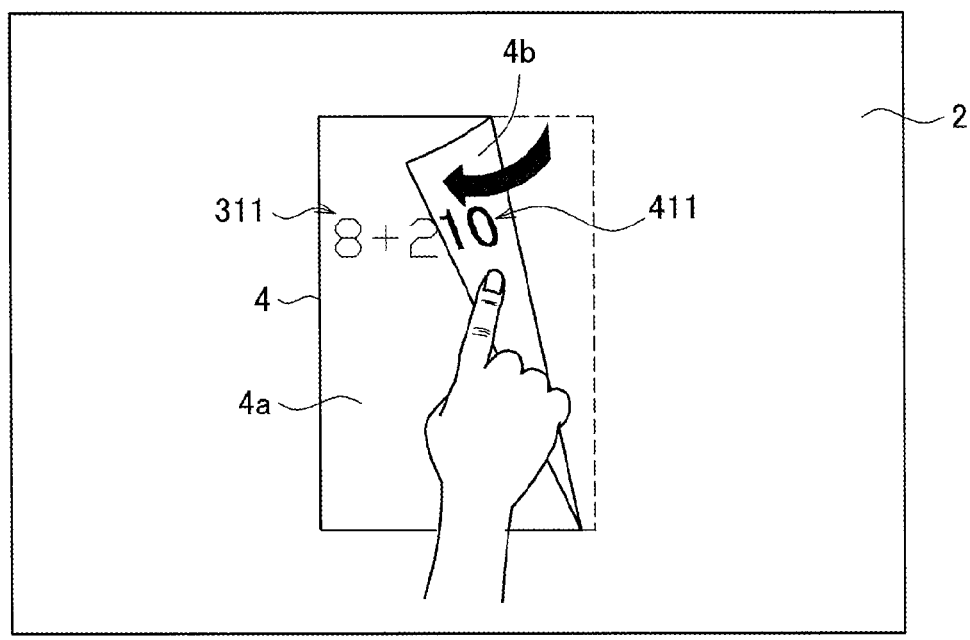
FIG. 13 is an explanatory diagram illustrating an example of digital information display on an object by physical operation of an object.

Also, when digital information is displayed on an actual object present in the extended work space, a display method in which digital information is written or depicted on the object itself may be presented. For example, as illustrated in FIG. 13, a paper 4 having a surface 4*a* on which a problem 311 is printed is put in the work surface 2 of the extended work space. When a user turns the paper 4 to look at the back side 4*b*, digital information 411 of the answer of the problem 311 is displayed on the back side 4*b*. As described above, the digital information 411 is displayed on the back side 4*b* of the paper 4 which is not actually printed, so as to intuitively present a user information.

(3) Movement of Digital Information in Response to Motion of Object

Further, digital information displayed in the extended work space may be moved by the object in the space. For example, as illustrated in the upper side of FIG. 14, digital information 412 is projected on the work surface 2 of the extended work space. Then, an actual object, for example the paper 4, is brought in the extended work space, and the digital information 412 projected on the work surface 2 is put so as to be displayed on the paper 4. As illustrated in the center of FIG. 12, when the digital information 412 is displayed on the paper 4, the information recognition display device 100 handles the digital information 412 in such a manner to move it integrally with the paper 4.

Thereafter, when the paper 4 is moved from left to right from the state illustrated in the center of FIG. 12 as illustrated in the lower side of FIG. 12, the digital information 412 displayed on the paper 4 also moves along with the movement of the paper 4. This process realizes an intuitive operation in which the digital information 412 is brought on the paper 4, so that a user can move the digital information 412 by the intuitively understandable operation. Although the above description has explained the process that moves the digital information 412 on the paper 4, a process that copies the digital information 412 on the paper 4 in the state illustrated at the center of FIG. 12 may be executed. In this case, when the paper 4 is moved as illustrated in the lower side of FIG. 12, the digital information 412 moves along with the paper 4 and is displayed on the paper 4, and the digital information 412 is also displayed at the original display position on the work surface 2.

Figure 14:
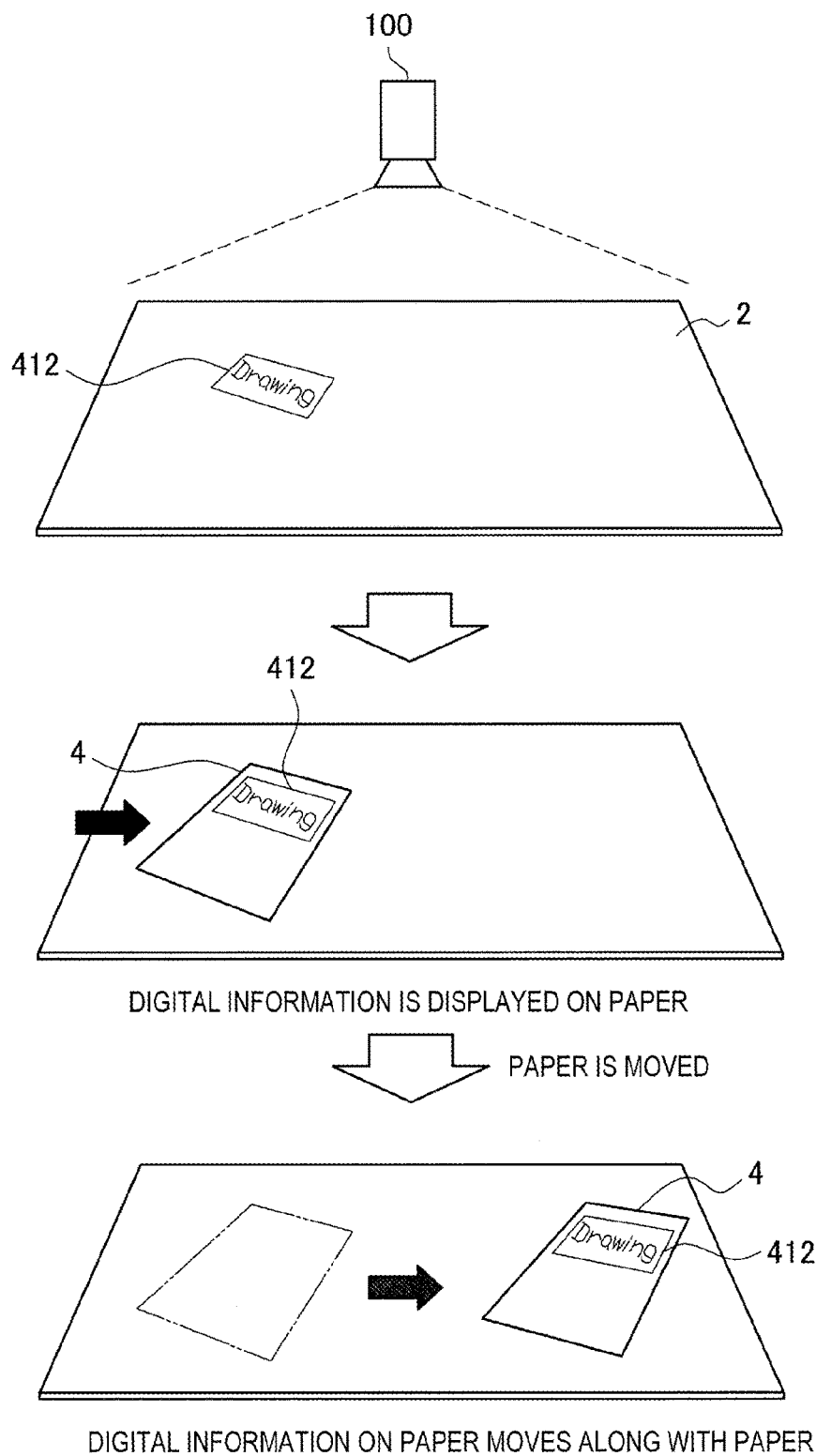
FIG. 14 is an explanatory diagram illustrating an example of a movement of digital information in response to a motion of an object by physical operation of an object.

In the operation of digital information illustrated in FIGS. 12 to 14, the object for operating digital information may be other than the paper 4, and may be a tablet terminal, a smartphone, an electronic paper, or the like, for example.

2. Hardware Configuration Example

Figure 15:
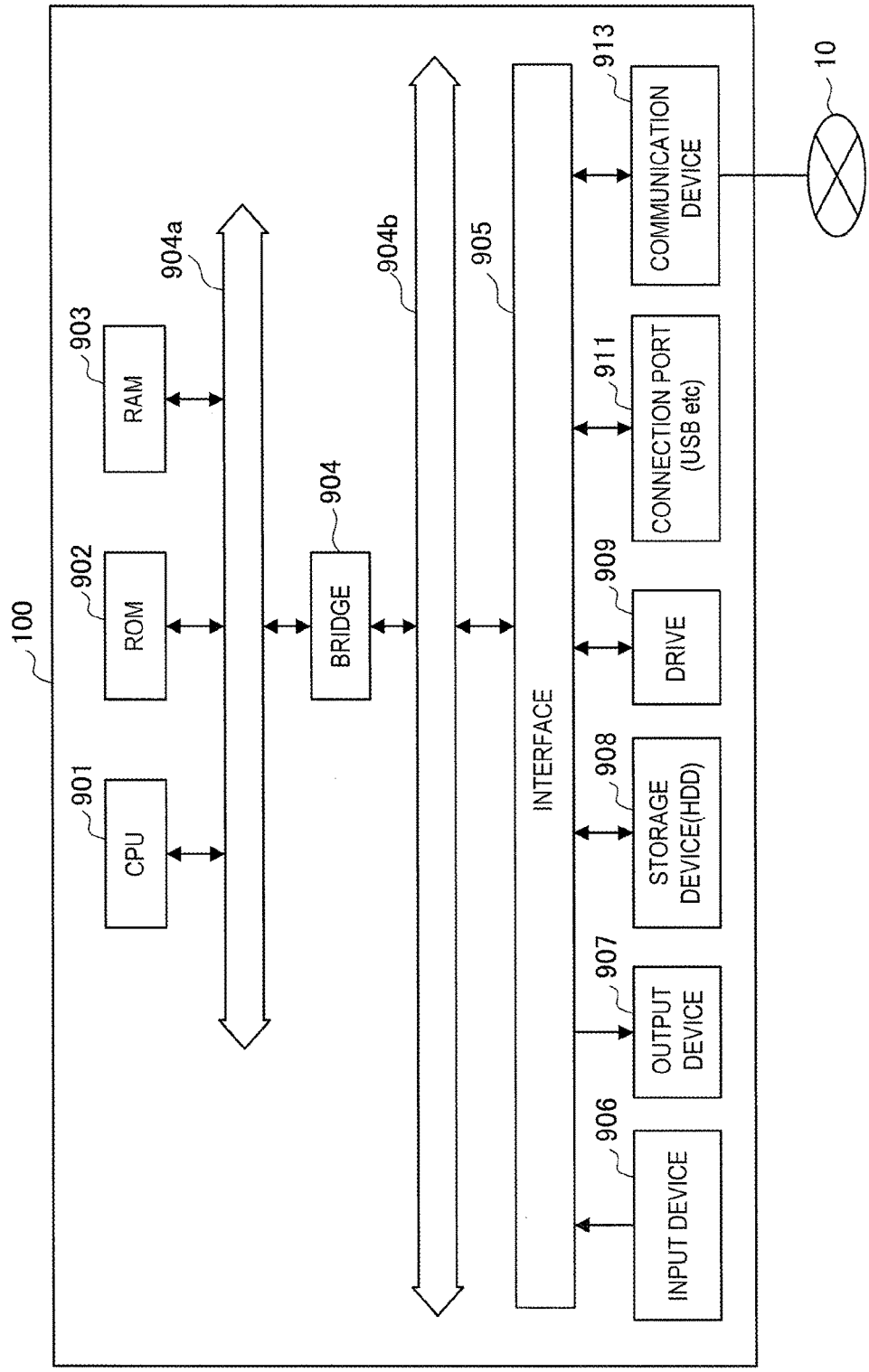
FIG. 15 is a block diagram illustrating a hardware configuration of an information processing unit.

The processing by the information processing unit 140 of the information recognition display device 100 according to the aforementioned embodiment can be executed by using hardware or software. In this case, the information processing unit 140 can be configured as illustrated in FIG. 15. Hereinafter, an example of a hardware configuration of the information processing unit 140 will be described based on FIG. 15.

The information processing unit 140 can be implemented by a processing apparatus such as a computer, as described above. As illustrated in FIG. 15, the information processing unit 140 includes a central processing unit (CPU) 901, a read only memory (ROM) 902, a random access memory (RAM) 903, and a host bus 904a. The information processing unit 140 also includes a bridge 904, an external bus 904b, an interface 905, an input device 906, an output device 907, a storage device (hard disk drive) 908, a drive 909, a connection port 911, and a communication device 913.

The CPU 901 functions as an arithmetic processing unit and a control unit, and controls overall operation of the information processing unit 140 according to a variety of programs. The CPU 901 may also be a microprocessor. The ROM 902 stores therein the programs, operational parameters, and the like that are used by the CPU 901. The RAM 903 temporarily stores therein the programs used and executed by the CPU 901, parameters appropriately varying in executing the programs, and the like. These are connected to each other through the host bus 904a configured of a CPU bus or the like.

The host bus 904a is connected to the external bus 904b such as a peripheral component interconnect/interface (PCI) bus through the bridge 904. Note that the host bus 904a, the bridge 904, and the external bus 904b do not have to be configured separately, and functions of these may be implemented by a single bus.

The input device 906 includes: an input unit for inputting information by a user, such as a mouse, a keyboard, a touch panel, buttons, a microphone, a switch, or a lever; an input control circuit generating input signals based on input by the user and outputting the signals to the CPU 901; and the like. The output device 907 includes: a display device such as a liquid crystal display (LCD) device, an organic light emitting diode (OLED) device, or a lamp; and an audio output device such as a speaker.

The storage device 908 is an example of a storage unit of the information processing unit 140 and is a device for storing data. The storage device 908 may include a storage medium, a recorder that records data in the storage medium, a reader that reads data from the storage medium, a deletion device that deletes data recorded in the storage medium, and the like. The storage device 908 is configured of, for example, a hard disk drive (HDD). The storage device 908 drives a hard disk and stores programs executed by the CPU 901 and a variety of data.

The drive 909 is a reader/writer and is built in or externally connected to the information processing unit 140. The drive 909 reads information recorded in the removable recording medium loaded in the drive 909 such as a magnetic disk, an optical disk, a magneto-optical disk, or a semiconductor memory, and outputs the information to the RAM 903.

The connection port 911 is an interface connected to an external device, and is a port of connection with the external device capable of transferring data through, for example, an universal serial bus (USB). The communication device 913 is a communication interface configured of a communication device or the like for connecting to, for example, the communication network 10. The communication device 913 may be a communication device supporting a wireless local area network (LAN), a communication device supporting a wireless USB, or a wired communication device that performs wired communication.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Although, in the above embodiments, the information processing unit 140 is provided in the information recognition display device 100, the present technology is not limited to such an example and may be provided in a server that is connected to a network.

Additionally, the present technology may also be configured as below.

(1) An information processing apparatus including:

an analysis unit configured to decide additional information corresponding to input information on the basis of the input information input in an extended work space in which a real object and a virtual object are operable; and a display control unit configured to receive a new operation input to the input information and execute display control of the virtual object displayed in the extended work space using the additional information.

(2) The information processing apparatus according to (1), wherein the analysis unit recognizes a writing trajectory input by handwriting of a user in the extended work space, and decides the additional information corresponding to the input information.

(3) The information processing apparatus according to (2), wherein
the analysis unit receives the writing trajectory input by handwriting of the user, from an input detecting device configured to process a signal transmitted from a writing device configured for handwriting input.

(4) The information processing apparatus according to (3), wherein
the writing device is capable of virtual writing input, and
the analysis unit recognizes the writing trajectory of the virtual writing input to set the writing trajectory as the additional information.

(5) The information processing apparatus according to any one of (1) to (4), wherein
the analysis unit recognizes information included in the real object present in the extended work space as input information, and decides the additional information corresponding to the input information.

(6) The information processing apparatus according to any one of (1) to (5), wherein
the additional information is information for determining whether or not to display the virtual object.

(7) The information processing apparatus according to any one of (1) to (6), wherein
the virtual object is information related to the input information recognized by the analysis unit.

(8) The information processing apparatus according to (1), further including:
a coordinate processing unit configured to convert position information of the virtual object displayed for the real object in the extended work space, to an object coordinates system specific to the real object in the extended work space related to the virtual object, and
wherein, upon receiving an operation input for moving the real object in the extended work space, the display control unit moves a display position of the virtual object according to a movement of the object.

REFERENCE SIGNS LIST 2 work surface
100 information recognition display device
110 projection unit
120 detection unit
130 imaging unit
140 information processing unit
142 analysis unit
144 coordinates processing unit
146 display control unit
148 setting storing unit
150 communication unit
200 digital pen
210 pen input detecting device
212 signal receiving unit
214 signal processing unit
216 input information transmitting unit

The invention claimed is:

1. An information processing apparatus, comprising:
circuitry configured to:
determine additional information that corresponds to input information based on the input information inputted in an extended work space in which a real object and a virtual object are operable, wherein the extended work space is separate from the information processing apparatus; and
receive a first operation input to the input information and control display of the virtual object in the extended work space by use of the additional information,
wherein the additional information includes hint information received from a remote location to enable collaboration.

2. The information processing apparatus according to claim 1, wherein the circuitry is further configured to:
recognize a writing trajectory input by handwriting of a user in the extended work space; and
determine the additional information that corresponds to the input information.

3. The information processing apparatus according to claim 2, wherein the circuitry is further configured to receive the writing trajectory input by handwriting of the user, from an input detecting device configured to process a signal transmitted from a writing device configured for handwriting input.

4. The information processing apparatus according to claim 3, wherein the writing device is capable of virtual writing input, and the circuitry is further configured to recognize the writing trajectory of the virtual writing input to set the writing trajectory as the additional information.

5. The information processing apparatus according to claim 1, wherein the circuitry is further configured to:
recognize information included in the real object present in the extended work space as the input information; and
determine the additional information that corresponds to the input information.

6. The information processing apparatus according to claim 1, wherein the additional information is information to determine whether to display the virtual object.

7. The information processing apparatus according to claim 1, wherein the virtual object is information related to the input information recognized by the circuitry.

8. The information processing apparatus according to claim 1, wherein the circuitry is further configured to
convert position information of the virtual object displayed for the real object in the extended work space, to an object coordinates system specific to the real object in the extended work space related to the virtual object, and
wherein upon reception of a second operation input to move the real object in the extended work space, the circuitry is further configured to move a display position of the virtual object in accordance with a movement of the object.

9. An information processing method, comprising:
in an information processing apparatus:
determining additional information that corresponds to input information based on the input information inputted in an extended work space in which a real object and a virtual object are operable,
wherein the extended work space is separate from the information processing apparatus; and
receiving an operation input to the inputted input information, and controlling display of the virtual object displayed in the extended work space by use of the additional information, wherein the additional information includes hint information received from a remote location to enable collaboration.

10. A non-transitory computer-readable storage medium having stored thereon, computer-executable instructions for causing a computer to execute operations in an information processing apparatus, the operations comprising:
  determining additional information that corresponds to input information based on the input information inputted in an extended work space in which a real object and a virtual object are operable, wherein the extended work space is separate from the information processing apparatus; and
  receiving an operation input to the inputted input information and control display of the virtual object in the extended work space by use of the additional information, wherein the additional information includes hint information received from a remote location to enable collaboration.

* * * * *